Patented Feb. 27, 1951

2,543,659

UNITED STATES PATENT OFFICE 2,543,659

MODIFICATION OF THE RELATIVE CONCENTRATION OF IONS IN FLUID MEDIA

Walter W. Durant, Old Greenwich, Conn., assignor to American Cyanamid Company, New York, N. Y., a corporation of Maine No Drawing. Application March 29, 1946, Serial No. 658,216

7 Claims. (Cl. 23—149)

This invention relates to the separation of different anions or to the modification of the ratio of one anion to another in a liquid by means of synthetic resinous anion active materials.

An object of the present invention is to provide a process by means of which one anion may be separated from another anion in a liquid.

Another object of this invention is to provide a process of altering the ratio of one anion to another anion in a liquid.

Still another object of my invention is to substantially separate one or more anions from one or more other anions in a liquid where one or more anions is undesirable in the original composition of the liquid or where one anion is of particular value itself, thereby rendering it available in purified form.

A further object of my invention is to provide a process for selectively removing undesirable anionic impurities from a liquid, especially when no satisfactory chemical method exists.

These, and many other objects which will be apparent from the following disclosure, are attained by contacting a liquid comprising a mixture of different anions with a synthetic resinous anion active material which has been activated and substantially completely saturated with a compound of a weak acid having a dissociation constant no greater than $1 \times 10^{-4}$.

The following examples in which the proportions are in parts by weight except as otherwise indicated are given by way of illustration and not in limitation.

Example 1

About 1 liter of an anion active resin, e. g., a granular guanidine-urea-formaldehyde resin gel (Resin "A"), is packed into a column about 2 inches in diameter and about 15 inches long. The bed of resin is substantially completely saturated with a 2% aqueous solution of sodium carbonate and washed with water until the pH of the effluent is about 7.5. An aqueous solution containing 0.15% boric acid and 0.15% sulfuric acid is passed through the carbonate-activated bed at the rate of about 30 cc. per minute. The pH of the effluent gradually drops from about 7 to about 6 during the passage of about 6000 cc. of solution through the bed. This first 6000 cc. portion of the effluent does not show the presence of any sulfate ion when a sample thereof is treated with a 5% aqueous solution of barium chloride but, on the other hand, the borate ion appears in the last 1200 cc.

Example 2

A bed of anion active resin is prepared in the manner set forth in Example 1 and through this bed an aqueous solution containing 0.2% of formic acid and 0.2% of oxalic acid is passed at the rate of approximately 30 cc. per minute. No oxalic acid is found in the first 7000 cc. of effluent during the passage of which the pH drops from about 7.5 to about 4.4 (4500 cc. through the bed), to about 3.4 (about 4800 cc. through the bed), to about 2.8 after the total of 7000 cc. have passed through the bed. The formic acid appears in the effluent after about 4000 cc. of effluent have passed through the bed.

Example 3

An aqueous solution containing about 0.23% of acetic acid and about 0.15% of hydrochloric acid is passed at the rate of approximately 30 cc. per minute through a resin bed which has been prepared as described in Example 1. The pH drops from about 7 to about 3.8 when the total effluent is about 3000 cc., to about 3.2 when the total effluent is about 5000 cc. and to about 2.8 when the total effluent is about 5800 cc. No chloride ion is found in the first 5000 cc. but a slight test for chloride ion is found after a total effluent of 5800 cc. has passed through the bed. On the other hand, acetic acid begins to come through the bed after less than about 3000 cc. of effluent have been collected.

Example 4

A resin bed is prepared according to Example 1, and an aqueous solution containing about 0.07 mol of acetic acid per liter together with about 0.068 mol per liter of butyric acid is passed through the bed at a rate of about 30 cc. per minute. A sample of the effluent is collected for analysis when about 7½ liters of solution have been passed through the bed. This sample is found to contain about 0.07 mol of acetic acid per liter, but the concentration of butyric acid has been reduced to approximately 0.05 mol per liter. Accordingly, this example indicates that acids as closely related as acetic acid and butyric acid may be substantially separated by repeating the process described above a sufficient number of times. Furthermore, in many instances it is desirable to reduce the concentration of a particular acid or anion to a specified point, and in such cases my process is of great utility.

Example 5

A 10% aqueous solution of crude alpha-hydroxyisobutyric acid, obtained from the acid hydrolysis of acetone cyanhydrin and containing approximately 97.5% of alpha-hydroxyisobutyric acid, is combined with about 2.5% of a mixture of ammonium chloride and hydrochloric acid in the molar ratio of 1.5:1. 11.25 liters of this solution are passed through two anion active resin beds such as that described in Example 1 connected in series. About 8 liters of solution may be fed to the beds before any chloride ion appears in the effluent from the first bed. This effluent, however, contains about 97% of the alpha-hydroxyisobutyric acid contained in the feed. No chloride ion appears in the effluent from the second bed. This solution may be further purified by passing it through a cation active material to remove the ammonia and undesired heavy metals if any be present and the water may be evaporated, preferably under vacuum, thereby leaving as a residue an extremely high grade of alpha-hydroxyisobutyric acid.

Example 6

A solution obtained by the acid hydrolysis of acetone cyanhydrin containing about 57% of alpha-hydroxyisobutyric acid together with about 13.3 of ammonium sulfate is diluted to a concentration of about 25% of the isobutyric acid. This solution is passed through an anion active bed prepared according to Example 1 until the sulfate ion appears in the effluent. The solution is preferably passed through the bed under pressure sufficient to keep the resin in the bed substantially quiescent inasmuch as beds which are fed under a low gravity head, for example, are agitated by bubbles of gas which are liberated within the bed. The effluent solution containing no sulfate ion is collected and may be subjected to further purification by passing it through a cation active bed until ammonia appears in the effluent. Finally the purified alpha-hydroxyisobutyric acid solution may be evaporated to dryness, thereby producing a highly purified acid.

Preparation of Resin "A"

24 parts of urea
26 parts of guanidine nitrate
98 parts of formalin (37% formaldehyde in water)
6.3 parts of soda ash
61 parts of water The water, formalin and soda ash are charged into a kettle, preferably glass-lined, which is equipped with a reflux condenser and an agitator. The urea and guanidine nitrate are then added, and the resulting mixture is heated to the reflux point and maintained at this point for about 1–6 hours. During this operation the mixture is thoroughly agitated. It is then transferred to a suitable vessel, preferably glass-lined, and heated to about 90° C. To this, with vigorous agitation, are added gradually about 3.6 parts of hydrochloric acid (specific gravity 1.19) in about 6.1 parts of water, and the material is then cooled as quickly as possible to about 70° C., thereby gelling the material. The gelled material should be further cooled, optionally by removing it from the vessel, breaking up into small blocks and spreading out on trays. The resulting material is ground to any desired fineness, e. g., a size that will pass 8 mesh.

The ground gel is distributed evenly on trays, preferably glass-lined, and these trays are placed in a suitable drier. The temperature is raised to about 50° C. and maintained at that point for about 5–6 hours. The temperature is then raised about 10° every half hour until about 100° C. is reached, and the temperature is maintained at this point for about 2 hours. If necessary, the material may be reground or screened to a suitable size.

In place of part or all of the urea-guanidine-formaldehyde resin used in the above examples, other active materials may be substituted. Among these any of the various anion active resins are useful, e. g., m-phenylene diamine-formaldehyde resins, biguanide-formaldehyde resins such as those described in U. S. Patent No. 2,251,234, guanyl urea-formaldehyde resins, etc. The active resins such as those prepared from guanidine, guanyl urea, biguanide and other materials which do not form sufficiently insoluble condensation products with formaldehyde for most practical purposes are preferably insolubilized with suitable formaldehyde-reactive materials, e. g., urea, the aminotriazines, especially melamine, the guanamines which react with formaldehyde to produce insoluble products, etc. These insolubilizing materials other than urea, e. g., melamine, may be substituted for the urea used in the preparation of Resin "A." The anion active resins prepared from guanidine, guanyl urea, biguanide, etc., may be prepared in the same general manner as Resin "A." Usually it is convenient to use the salts of the bases, but the free base may also be used. Examples of suitable salts for use in the preparation of anion active resins are: guanidine carbonate, guanidine sulfate, biguanide sulfate, biguanide nitrate, guanyl urea sulfate, guanyl urea nitrate, guanyl urea carbonate, etc.

Anion active resins produced as described above may be activated or regenerated by passing a dilute solution of sodium carbonate, caustic soda, potassium carbonate, potassium hydroxide, organic bases and the like through the bed and subsequently washing with water until substantially free from alkali. The effluent from the regeneration process will contain the anion which has been preferentially extracted by the resin from the solution containing a plurality of anions originally passed through the bed, together with none or a relatively small proportion of the other anion or anions present in the original mixture. Accordingly, if the ion preferentially held on the bed is of sufficient value it may be recovered from this regenerating solution in which it will be in the form of the salt corresponding to the regenerating material used, e. g., the sodium salt if a sodium alkali be used for regeneration.

In some instances it may be desirable to recirculate part or all of the effluent from a bed, or it may be advisable to pass part or all of the effluent from one bed through a second bed and then optionally to pass the effluent thereof through still further beds of active material. This modification of my process is particularly suitable in those cases where the degree of separation is relatively small. Frequently it will be found to be more convenient to pass this solution through a single bed which has sufficient capacity and which has sufficient length that a proper effect is obtained.

The terms "weak" and "strong" in designating the types of anions are used in the general sense usually employed by chemists. Thus a strong anion normally will replace a weaker anion in an aqueous solution. The compound used for activation of the anion resin and substantially complete saturation thereof with an anion should be composed of a weak anion and a strong cation. More specifically, the dissociation constant of the acid corresponding to the anion of the saturating compound should be no greater than $1 \times 10^{-4}$. Of the two or more anions in the liquid to be processed, at least one when associated with hydrogen, must be a stronger acid than that corresponding to the anion of the saturating compound, i. e., its dissociation constant must be greater than $1 \times 10^{-4}$, and it must also be stronger than corresponding acids derived from the other anions present in the liquid. The material used to activate and saturate the bed of anion active resin and the anions to be separated are selected in accordance with these principles.

In many instances it is desirable to obtain a product having a specified concentration of anions. Furthermore it is desirable to obtain a uniform product, that is, one having approximately the same concentration of anions repeatedly. In order to accomplish these desiderata, an experimental run is carried out during which samples of the effluent are taken at frequent intervals, and the ratio of the anions is determined by any suitable means such as, for example, by chemical analysis. The results of these determinations may be conveniently plotted on graph paper with the ratio of anions versus the total effluent. From this graph it is possible to forecast in subsequent runs under similar conditions the total amount of effluent which should be drawn off to obtain the desired ratio of the anions.

Another method for obtaining reproducible materials having approximately the same ratio of anions is by the use of periodic determinations of the pH of the effluent from the bed of anion active material. The pH of the effluent versus the total amount of effluent may be plotted on graph paper. If the ratio of the anions be determined at various pH values, then upon subsequent runs under similar conditions that fraction of the effluent which contains the desired ratio of anions may be obtained by collecting the effluent until the pH corresponds to the desired ratio of anions. Obviously by similar conditions I mean that the feed solution, the temperature, the rate of flow, the ion active material, etc., are all substantially identical.

My invention apparently has wide applicability in the separation of inorganic acids one from another, in the separation of inorganic acids from organic acids, in the separation of organic acids one from another, in the separation of monobasic acids from dibasic acids, etc. While I have mentioned the separation of acids, it is to be understood that anions of those acids may be separated whether in the form of acids or in the form of salts.

The present invention is limited to the use of synthetic resinous anion active materials. These ion active materials are aldehyde condensation products of aldehyde-reactive materials, the aldehyde preferably being formaldehyde. To be of practical use, the resinous anion active materials must be substantially insoluble.

Obviously many modifications and variations in the compositions and processes described above may be made without departing from the spirit and scope of the invention as defined in the appended claims.

This is a continuation-in-part of my copending application, Serial No. 427,769, filed January 22, 1942, now abandoned.

I claim:

1. A process for changing the ratio of a plurality of anions in an aqueous medium which comprises passing an aqueous feed solution containing a plurality of anions including anion A' and anion A'' through a bed of synthetic resinous anion active material which has been substantially completely saturated with anion A by treatment with a compound of the formula CA where C is the cation of a strong base and A is an anion which forms with hydrogen a dissociable compound having a dissociation constant no greater than $1 \times 10^{-4}$, said dissociable compound being weaker than the acid corresponding to anion A' which, in turn, is stronger than the acid corresponding to anion A'', said synthetic resinous anion active material acting preferentially to retain A' anions of the aqueous feed solution, and collecting a portion of the effluent after A'' appears therein and before the effluent contains the original plurality of anions including A' and A'' in substantially the same ratio as originally in the feed solution.

2. A process for changing the ratio of a plurality of anions in an aqueous medium which comprises passing an aqueous feed solution containing a plurality of anions including anion A' and anion A'' through a bed of synthetic resinous anion active material comprising a substantially insolubilized guanidine-formaldehyde resin which has been substantially completely saturated with anion A by treatment with a compound of the formula CA where C is the cation of a strong base and A is an anion which forms with hydrogen a dissociable compound having a dissociation constant no greater than $1 \times 10^{-4}$, said dissociable compound being weaker than the acid corresponding to anion A' which, in turn, is stronger than the acid corresponding to anion A'', said synthetic resinous anion active material acting preferentially to retain A' anions of the aqueous feed solution, and collecting a portion of the effluent after A'' appears therein and before the effluent contains the original plurality of anions including A' and A'' in substantially the same ratio as originally in the feed solution.

3. A process for the separation of at least one acid from a mixture of acids which comprises treating an anion active synthetic resinous material with a dilute solution of an alkali, washing the treated material with water until the wash water is substantially free of the alkali, contacting with said treated and washed material an aqueous solution containing a mixture of acids including a plurality of acids, the anions of which are different from the anion of said alkali and including at least one acid which is stronger than the dissociable hydrogen compound of the anion of the alkali used to treat the resinous material and which is stronger than the other acids present in the mixture, and separating said aqueous solution from said anion active synthetic resinous material after the comparatively strong acid component of the mixture has been preferentially retained by the alkali-activated material and before said aqueous solution contains the original mixture of acids in substantially the original relative proportions.

4. A process for the separation of at least one acid from a mixture of acids which comprises treating an anion active synthetic resinous material with a dilute solution of sodium carbonate, washing the treated material with water until the wash water is substantially free of sodium carbonate, contacting with said treated and washed material an aqueous solution containing a mixture of acids including a plurality of acids other than carbonic acid and including at least one acid which is stronger than carbonic acid and stronger than other acids present in the mixture, and separating said aqueous solution from said anion active synthetic resinous material after the comparatively strong acid component of the mixture has been preferentially retained by the activated material and before said aqueous solution contains the original mixture of acids in substantially the original relative proportions.

5. A process for the separation of at least one acid from a mixture of acids which comprises treating an anion active synthetic resinous material with a dilute solution of sodium hydroxide, washing the treated material with water until the wash water is substantially free of the sodium hydroxide, contacting with said treated and washed material an aqueous solution containing a mixture of acids including at least one acid which is stronger than other acids present in the mixture, and separating said aqueous solution from said anion active synthetic resinous material after the comparatively strong acid component of the mixture has been preferentially retained by the activated material and before said aqueous solution contains the original mixture of acids in substantially the original relative proportions.

6. A process for the separation of an acid from a mixture of two acids which comprises treating an anion active synthetic resinous material with a dilute solution of an alkali, washing the treated material with water until the wash water is substantially free of the alkali, contacting with said treated and washed material an aqueous solution containing two acids, both of which have anions different from the anion of said alkali and one of which is stronger than the dissociable hydrogen compound of the anion of the alkali used to treat the resinous material and stronger than the other acid present in the mixture, and separating said aqueous solution from said anion active synthetic resinous material after the stronger acid has been preferentially retained by the activated material and before said aqueous solution contains the two acids in substantially the original relative proportions.

7. A process for the separation of a mixture of boric acid and sulfuric acid in aqueous solution which comprises treating a bed of anion active synthetic resinous material with a dilute solution of sodium carbonate, washing said treated bed with water until the pH of the effluent therefrom is about 7.5, passing said aqueous solution containing said mixture of boric acid and sulfuric acid through said treated and washed resinous bed until the pH of the effluent therefrom has dropped to about 6, and recovering the boric acid from said effluent, the anion active synthetic resinous bed having retained the major portion of the sulfuric acid.

WALTER W. DURANT.

REFERENCES CITED

The following references are of record in the file of this patent:

UNITED STATES PATENTS

| Number | Name | Date |
|---|---|---|
| 1,978,447 | Austerweil | Oct. 30, 1934 |
| 2,157,510 | Urbain | May 9, 1939 |
| 2,204,072 | Dean | June 11, 1940 |
| 2,366,651 | Rawlings | Jan. 2, 1945 |
| 2,413,784 | Rawlings | Jan. 7, 1947 |
| 2,413,844 | Rawlings | Jan. 7, 1947 |

FOREIGN PATENTS

| Number | Country | Date |
|---|---|---|
| 805,092 | France | Aug. 17, 1936 |

OTHER REFERENCES

Burrell: "Organolites," Ind. and Eng. Chem., vol. 30, No. 3, (1938), pages 358–363, Amer. Chem. Soc. Pubs.

Swartz et al.: Ind. and Eng. Chem., vol. 32, No. 11 (Nov. 1940), pages 1462–1466.

Handbook of Chemistry and Physics, 28th Ed., Chemical Rubber Publ. Co., Cleveland, Ohio (1944), page 1366.